United States Patent
Bulin et al.

(10) Patent No.: US 8,739,516 B2
(45) Date of Patent: Jun. 3, 2014

(54) TURBOREACTOR FOR AIRCRAFT

(75) Inventors: Guillaume Bulin, Blagnac (FR); Patrick Oberle, Verdun sur Garonne (FR)

(73) Assignee: Airbus Operations SAS, Toulouse (FR)

( * ) Notice: Subject to any disclaimer, the term of this patent is extended or adjusted under 35 U.S.C. 154(b) by 759 days.

(21) Appl. No.: 12/306,177

(22) PCT Filed: Jun. 19, 2007

(86) PCT No.: PCT/FR2007/051470
§ 371 (c)(1),
(2), (4) Date: May 8, 2009

(87) PCT Pub. No.: WO2008/000994
PCT Pub. Date: Jan. 3, 2008

(65) Prior Publication Data
US 2009/0301057 A1     Dec. 10, 2009

(30) Foreign Application Priority Data
Jun. 27, 2006   (FR) ...................................... 06 52653

(51) Int. Cl.
*F02K 99/00*      (2009.01)
(52) U.S. Cl.
USPC ............. 60/266; 60/226.1; 60/226.3; 60/770; 60/267; 60/785; 60/782; 60/806

(58) Field of Classification Search
USPC ............ 60/266, 226.1, 226.3, 770, 267, 782, 60/785, 806, 39.511, 39.5
See application file for complete search history.

(56) References Cited

U.S. PATENT DOCUMENTS

| | | | | |
|---|---|---|---|---|
| 3,528,250 | A | * | 9/1970 | Johnson ........................... 60/762 |
| 4,254,618 | A | * | 3/1981 | Elovic ........................... 60/226.1 |
| 5,203,163 | A | * | 4/1993 | Parsons ........................ 60/226.1 |
| 5,269,135 | A | | 12/1993 | Vermejan |
| 6,112,514 | A | * | 9/2000 | Burdisso et al. ............. 60/226.1 |
| 6,282,881 | B1 | * | 9/2001 | Beutin et al. .................. 60/39.08 |
| 2005/0150970 | A1 | | 7/2005 | Beutin et al. |

FOREIGN PATENT DOCUMENTS

| | | |
|---|---|---|
| EP | 0 924 409 | 6/1999 |
| EP | 1 555 406 | 7/2005 |
| GB | 2 234 805 | 2/1991 |
| GB | 2272025 A * | 5/1994 |

* cited by examiner

*Primary Examiner* — Craig Kim
(74) *Attorney, Agent, or Firm* — Patterson Thuente Pedersen, P.A.

(57) ABSTRACT

The invention concerns a turbojet for aircraft including engine located in nacelle, and thermal exchanger intended to cool a fluid participating in the engine propulsive system, characterized in that said thermal exchanger is located on engine external wall, an interstitial space within which air can circulate being arranged between the engine external wall and a lower wall of said thermal exchanger. The invention also concerns an aircraft provided with at least one such turbojet.

17 Claims, 2 Drawing Sheets

TURBOREACTOR FOR AIRCRAFT

RELATED APPLICATIONS

The present application is a national stage entry of PCT Application No. PCT/FR2007/051470, filed Jun. 19, 2007, which claims priority from French Application Number 0652653, filed Jun. 27, 2006, the disclosures of which are hereby incorporated by reference herein in their entirety.

TECHNICAL FIELD

The invention concerns a turbojet for aircraft. More precisely the invention concerns a thermal exchanger, also called surfacic exchanger, fitted in a turbojet.

BACKGROUND OF THE INVENTION

In the civil aviation domain, it is known to use an additional thermal exchanger to cool the oil that circulates in the turbojet engine. Hot oil is brought in the thermal exchanger to be cooled before being reused in the propulsive system.

In cross-section in prior art FIG. 1 of the state of the technique, a turbojet 1 is represented as well as two heat exchangers 6 and 12 representing the state of the technique. Turbojet 1 includes a nacelle 2 in which is placed an engine 3. Engine 3 is attached to internal wall 4 of nacelle 2 through air bifurcations 5.

In the state of the technique, there are generally two possible positions for the thermal exchanger 6 and 12 The thermal exchanger 6 and 12 can be positioned integral with the engine body 3, or integral with the nacelle 2.

When thermal exchanger 6 is mounted at the level of engine body 3, it is more precisely fitted in an internal volume 7 provided between a motor cover 8 surrounding at least partially engine 3, and engine 3 itself. An air intake 9 takes cold air in the cold air flow passing through turbojet 1, to bring it inside thermal exchanger 6. Cold air passes through the thermal exchanger matrix, in which circulates the hot oil to be cooled. Both fluids are separated one from the other by baffles, and don't mix. Heat exchange takes place inside the matrix. Partially reheated air exit from thermal exchanger 6, through air outlet 10, to be reinjected in the secondary air flow 14 exiting from the nacelle.

In case thermal exchanger 12 is positioned at the level of nacelle 2, it is more precisely fitted in the internal volume of said nacelle 2. An air intake 13 takes cold air in the cold air flow passing through turbojet 1, to bring it inside said thermal exchanger 12. After passing through the matrix of thermal exchanger 12, this air flow is either ejected outside nacelle 2 through air outlet 14, or reintroduced in the internal flow of the engine through a specific air outlet (not represented).

Such thermal exchangers 6 and 12 don't prove to be an optimal solution in term of propulsion efficacy and aerodynamic impact on the engine, and this for several reasons. In case the air that crosses the exchanger matrix is rejected outside of the internal flow of the engine, i.e. in case the heat exchanger 12 is installed with air outlet towards the outside as depicted in FIG. 1, the air intake 13 constitutes a direct loss of propulsive efficacy insofar as it contributes little, if at all, to the engine thrust. In case the air that passes through the thermal exchanger matrix is reintroduced in the internal flow of the engine, as is the case of an installation of heat exchanger 6 inside the engine body 3, the thermal exchanger matrix, from its internal architecture, induces a large load loss in the flow and the flow through air output 10 tends to disrupt more or less significantly the downstream aerodynamic flow of the engine. In addition, the presence of an air intake 9, with one or several internal ducts, as well as an air outlet 10 generates load losses and disrupts more or less significantly the internal flow of the engine 3.

Another known solution is to use a plate exchanger 15. A plate exchanger 15 is notably known to match locally the shape of internal wall 4 of nacelle 2 to which it is coupled. Lower face 16 of the thermal exchanger is coupled to internal wall 4 of the nacelle, while a upper face 17 is located in the cold air flow that passes through the internal volume of nacelle 2. The heat transported within the exchanger 15 is transferred by thermal conduction to the internal surface of the plate forming the upper face 17 of aforesaid thermal exchanger. This hot plate is cooled by the passage of cold secondary air 14 flowing into nacelle 2. The heat stored in the hot plate is thus dissipated by forced convection toward the aerodynamic flow of turbojet 1.

One inconvenience of the plate exchanger 15 embodiment of a thermal exchanger of the state of the technique is that it is incompatible with the current systems for reducing sound nuisance coming out of the turbojet. Indeed, in order to reduce said sound nuisances, it is known to at least partially cover internal wall 4 of nacelle 2 with an acoustic coating 11. More generally, such acoustic coating 11 covers the internal and external walls of nacelle 2 and motor cover 8 since these walls are facing each other. The presence of such acoustic coating 11 is incompatible with the coupling of the plate thermal exchanger on internal wall 4 of nacelle 2. It would require, in order to use such plate thermal exchanger, to suppress acoustic coating 11 locally, which proves difficult given the dimensionality specifications related to sound nuisance.

SUMMARY OF THE INVENTION

The thermal exchanger according to an embodiment of the invention is intended, for example, to cool a fluid of the turbojet propulsive system, such as oil, so that it can be reinjected at least partially cooled into aforesaid propulsive system. The invention also concerns an aircraft including at least one such turbojet.

In general, the thermal exchanger according to the invention finds applications from the moment a fluid intended to circulate inside or in the periphery of a turbojet requires cooling.

With the invention, an attempt is made to provide an alternative to the current location of thermal exchangers intended to cool a fluid passing through said thermal exchange by contact with a tangent gaseous flow.

In order to do that, the invention proposes to place the thermal exchanger not at the level of a cold wall of the nacelle, at which level an acoustic coating may be present, but at the level of a wall of the engine or of the nacelle where such acoustic coating is not present. Considering the present configuration of the turbojets, only the portion of engine external wall that is located downstream from the nacelle, i.e. at the level of the nozzle of aforesaid engine, is susceptible to receive the thermal exchanger according to the invention. This external wall portion being located at the level of the ejection opening of the primary air flow (i.e., of FIG. 4) exiting engine, it is susceptible to undergo very important temperature increases. Because of that, the risk becomes that thermal exchange would not occur from the hot fluid passing through thermal exchanger toward the (i.e., of FIG. 1) cold air flowing over aforesaid thermal exchange, but from the hot engine wall toward the less hot fluid crossing thermal exchanger.

In the invention, in order to avoid this undesirable calorific exchange, while maintaining the advantageous position of the thermal exchanger at the level of the engine's nozzle, we propose to thermally isolate the thermal exchanger from the hot wall on which it is installed. In order to do that, a thermally insulating air layer is provided between the engine hot external wall and the inner wall of the thermal exchanger, in order to limit undesirable exchanges of heat between these two walls. By inner wall we mean the exchanger wall directed toward the engine, as opposed to the outer wall, which is directed toward the nacelle internal wall. This insulating air layer avoids direct contact between the engine hot wall and the inner wall of the thermal exchanger, by creating a high thermal resistance between the two walls. The air inlet and outlet provided at the level of the insulating air layer are such that the air flow is sufficient to avoid too long a stagnation of air in the space provided between the two walls. Indeed, if the air flow is null or insufficient, the insulating air layer that stagnates there is at risk to be heated by the engine hot wall, and therefore to no longer play its thermal insulator role. One can also provide an air pocket, i.e. stagnant air in the space provided between the two walls, said air pocket being renewed regularly, e.g. by opening a hot air outlet valve and opening a valve permitting cold air entry. Of course, the thermal exchanger according to the invention can also be located upstream from the nozzle, or even on the nacelle internal wall. The insulating air layer will then have less of a function, but will not be damaging to the exchanger operation.

Therefore the invention has for object a turbojet for aircraft including an engine located in a nacelle and a thermal exchanger intended to cool a fluid participating to the engine propulsive system, characterized in that the thermal exchanger is fitted at the level of the engine external wall, an interstitial space within which air circulates between the engine external wall and an inner wall of the thermal exchanger. Interstitial space means a reduced volume space, in order to minimize the distance between the thermal exchanger and the hot wall of the engine, notably in order not to create an excessive protuberance on the external surface of the engine wall, which could generate aerodynamic disruptions. The external contour of the interstitial space according to the invention follows an external contour of the thermal exchanger that it isolates.

The thermal exchanger can be a surfacic exchanger, such as a plate exchanger, provided with one or several plates through which the fluid to be cooled circulates, the cooling air being circulated between the plates. It is also possible that the thermal exchanger includes a housing crossed by a tubing in which the fluid to be cooled circulates, the cooling air being circulated around the tubing.

Preferentially, the thermal exchanger according to the invention is arranged at the rear extremity of the engine where there is no acoustic coating susceptible to cover the external wall of said engine.

From examples of embodiment of the turbojet according to the invention, it is possible to foresee all or part of the following additional characteristics:
The turbojet includes means for attaching the thermal exchanger to the external wall of the engine;
The means of attachment include at least one strut. The strut(s) can be vertical or horizontal;
The interstitial space forms an air pocket, in which air is partially stagnant. Partially stagnant means here that the hold-up time in the nacelle of the cooling air passing in transit through the air pocket is greater than the hold-up time in the nacelle of cold air passing through the general internal volume of the nacelle.

The external wall of the engine includes a recess in which the thermal exchanger is located, in order to extend in the wake of the engine. All protuberances susceptible to generate aerodynamic disruptions are thus suppressed at the surface of the engine external wall.

The thermal exchanger is provided with an air inlet, arranged upstream from the body of the thermal exchanger, capable to bring air in the interstitial space;

The air inlet takes air from the secondary air flow crossing the nacelle. Otherwise, it is possible to take air in the ventilation air volume provided between the engine body and the engine cover.

The thermal exchanger includes an air outlet provided downstream from the body of the thermal exchanger, enabling the air that circulates in the interstitial space to move out of aforesaid interstitial space, for example, in the secondary flow crossing the nacelle. It is also possible to reinject the air flow in the ventilation air volume.

The air inlet and outlet feeding the interstitial space can be formed by a simple slot or opening. It is also possible to provide said air inlet and outlet with specific shutting means, in order to regulate at will the entry and exit of air in aforesaid interstitial space.

The thermal exchanger is provided over all the external circular perimeter of the engine. It is also possible to have a punctual surfacic thermal exchanger, i.e. only covering a limited part of the external surface of the engine hot wall.

BRIEF DESCRIPTION OF THE DRAWINGS

The invention will be better understood by reading the following description and by examining the accompanying figures. These are presented for guidance and are not in any way restrictive of the invention.
The figures represent.

DETAILED DESCRIPTION OF THE DRAWINGS

Figure 2:
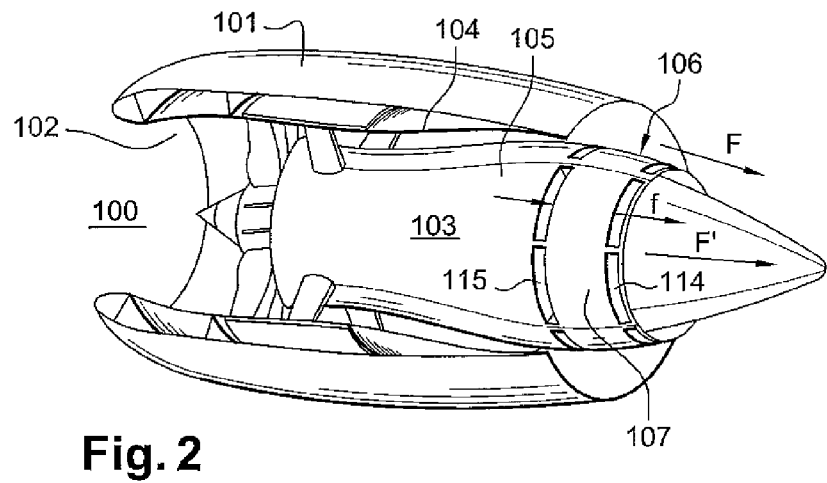
FIG. 2: an exploded schematic representation of a turbojet including a thermal exchanger according to an example of embodiment of the invention.

In FIG. 2, is represented a turbojet 100 provided with a thermal exchanger 107 according to the invention.

Figure 1:
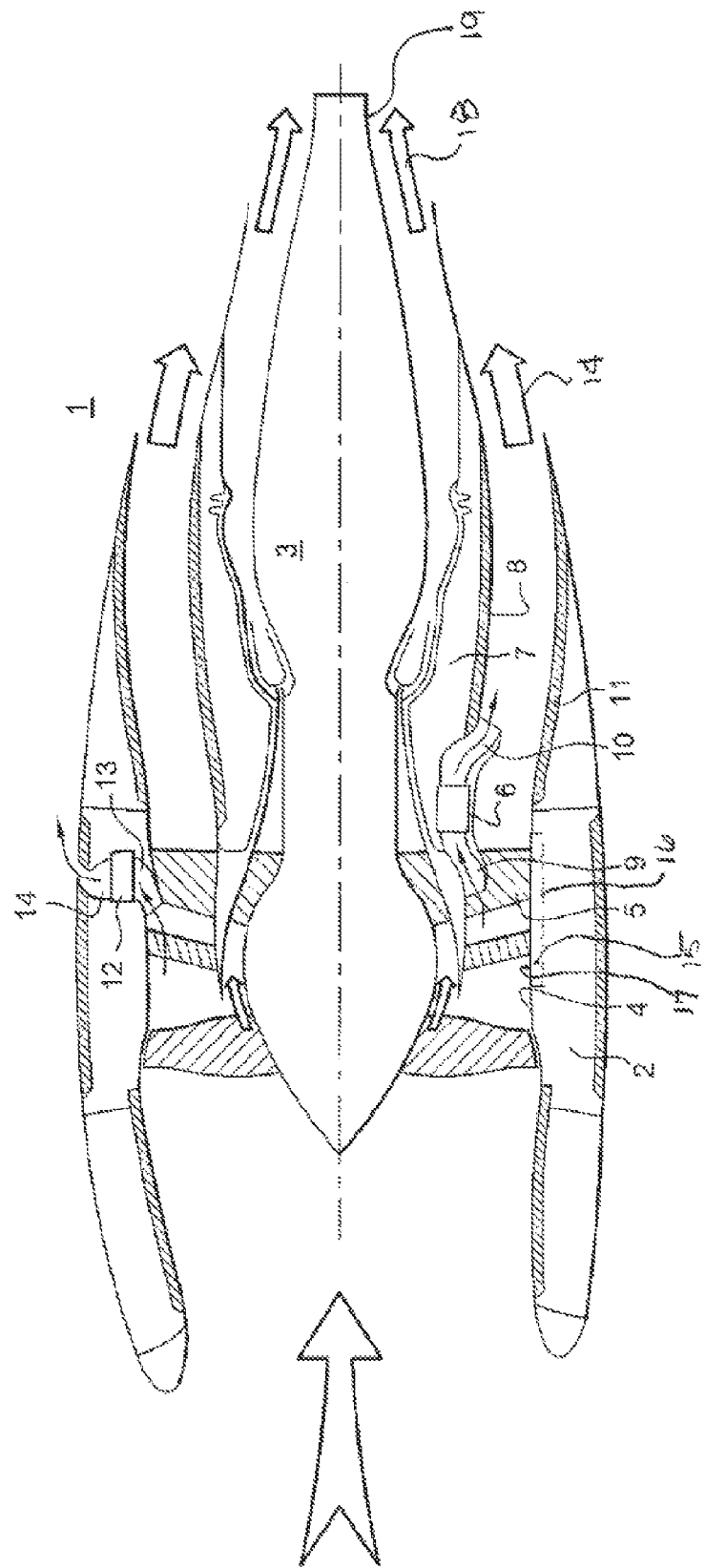
FIG. 1: a cross section view of a prior art turbojet provided with a thermal exchanger of the already described state of the technique.

Turbojet 100 includes a nacelle 101 which comprises an internal volume 102 to receive an engine 103. As already exposed in the state of the technique description in FIG. 1, internal wall 104 of nacelle 101 is most often coated with an acoustic treatment (not represented), as well as a front part of external wall 105 of engine 103, facing internal wall 104 of nacelle 101. Conversely, rear extremity 106 of engine 103, not enclosed within nacelle 101, is always without such acoustic coating. According to the invention, thermal exchanger 107 is advantageously fitted at the surface level of rear extremity 106 of engine 103. Here, front and rear are meant in relation to the direction of secondary air flow F passing between the nacelle 101 and engine 103.

Figure 3A:
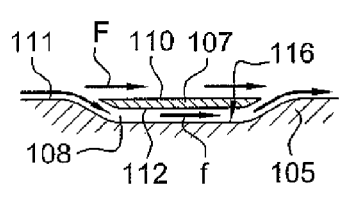
FIGS. 3A and 3B: two schematic representations, in cross-section view, of the positioning of thermal exchanger according to the invention on the engine external wall.
Figure 3B:
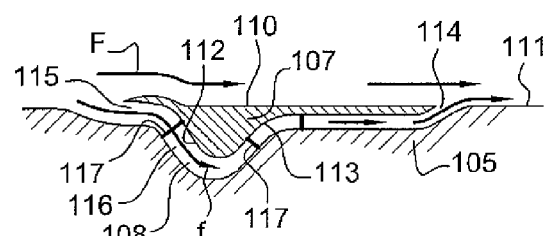

In FIGS. 3A and 3B are represented two sections of external wall 105 of engine 103 at the surface level of rear extremity 106, provided with thermal exchanger 107.

External wall 105 of engine 103 is excavated or depressed in order to provide a recess 108 for receiving thermal exchanger 107. Thus, outer wall 110 of the thermal exchanger 107, directed towards internal wall 104 of nacelle 101, is flush with external surface 111 of external wall 105 of engine 103. The secondary air flow passing through internal volume 102 of nacelle 101 undergoes no aerodynamic disruptions from the presence of thermal exchanger 107.
Interstitial space 116 according to the invention is arranged in recess 108, and is delimited by lower wall 112 of thermal exchanger 107 and external surface 111 of external wall 105 of engine 103.

In the example represented in FIG. 3A, thermal exchanger 107 is formed for instance by a housing in which circulates the fluid to be cooled, such as oil coming from the propulsive system of engine 103.

In FIG. 3B is represented another form of thermal exchanger 107. The contour of recess 108 arranged between external surface 111 of external wall 105 of engine 103 and lower wall 112 of thermal exchanger 107, appreciably follows the external contour of aforesaid thermal exchanger 107. In one embodiment, a bottle neck 113 is formed within corresponding interstitial space 116, in order to reduce the air output at the level of air outlet 114 arranged downstream from thermal exchanger 107. Here, upstream and downstream, are meant in relation to the direction of secondary air flow F inside internal volume 102 of nacelle 101. An air pocket is thus formed in which the air forming the insulating air layer is partially stagnant.

In any case, interstitial space 116 can be crossed by isolating air flow f for example coming from secondary air flow F circulating in nacelle 101.

Air inlet 115 provided upstream from thermal exchanger 107 is oriented in to the direction of secondary air flow F in order to facilitate air entry in interstitial space 116.

Air outlet 114 can be an aerodynamic opening, in order to limit drag, and to facilitate the exit of isolating air f.

Thermal exchanger 107 is, for example, attached to external surface 111 of external wall 105 of engine 103 by struts 117 whose dimensions are proportional to the dimensions that one wishes to give to aforesaid interstitial space 116.

In another example of embodiment, and as represented in FIG. 2, thermal exchanger 107 is directly arranged on external wall 105 of engine 103. Indeed, the external wall 105 is excavated in order to fit a crossing slot between a first and a second layers of external wall 105, both layers remaining united locally to one another. Here, crossing slot means that it opens in two points upstream and downstream. Thermal exchanger 107 is arranged in the thickness of the first layer, or upper layer.

As such, it guarantees no difference of level, on external surface 111 of external wall 105 of engine 103, susceptible to create aerodynamic disruptions.

In the example represented in FIG. 2, thermal exchanger 107 is arranged over the whole external perimeter of engine 103. Of course, it is also possible to arrange thermal exchanger 107 on a partial external perimeter of aforesaid engine 103.

Vertical struts 117 are represented in FIG. 3B, connecting inner wall 112 of the exchanger to external surface 111 of external wall 105 of engine 103. Here, vertical means that the struts extend radially from the wall of the engine up to thermal exchanger 107.

Figure 4A:
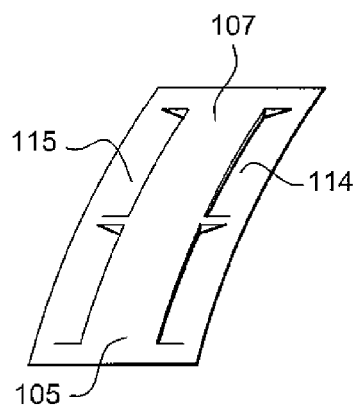
FIGS. 4A and 4B: two enlargements of the external wall of an engine provided with two examples of embodiment of thermal exchangers according to the invention.
Figure 4B:
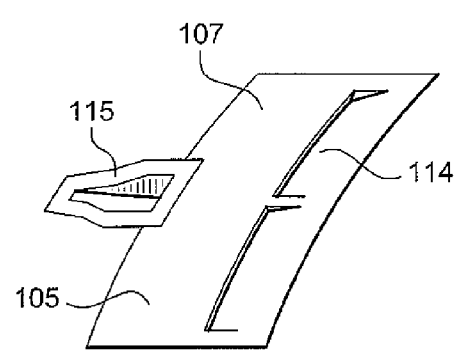

In FIGS. 4A and 4B, one can see an enlargement of external wall 105 of engine 103, at the level of a thermal exchanger 107 according to the invention. Air inlet 115 in FIG. 4A is symmetrical to air outlet 114. More precisely, air inlet 115, like air outlet 114, are formed by a longitudinal slot, extending over the whole width of thermal exchanger 107. Here width means the dimension extending vertically in relation to the longitudinal axis of the turbojet.

In FIG. 4B, on the contrary, air inlet 115 is punctual, meaning arranged on a partial width of thermal exchanger 107. Thus, isolating air flow f penetrating in interstitial space 116 is less important in the example represented in FIG. 4B than in the example represented in FIG. 4A.

In any case, isolating air flow f transiting through interstitial space 116 is capable of maintaining a thermal insulation between hot wall 105 of engine 103 and inner wall 112 of thermal exchanger 107 in order to minimize heat exchange between these two walls 105 and 112.

Isolating air flow f exiting through air outlet 114, as represented in FIG. 2, mixes with secondary air flow F exiting the internal volume of the nacelle, and with primary air flow F' exiting the nozzle. The quantity of air taken from secondary air flow F to feed the interstitial space being relatively low, it does not disrupt the aerodynamic flow within internal volume 102 of nacelle 101. In addition, in case the air flow is appropriated in the ventilation volume arranged between the engine cover and body, there is no aerodynamic disruption within nacelle 101.

The invention claimed is:

1. A turbojet for an aircraft including an engine located in a nacelle the turbojet comprising:
a thermal exchanger adapted to cool a liquid participating in the engine propulsive system, wherein said thermal exchanger is located downstream from the nacelle and at a surface level of an external wall of the engine, an interstitial space being defined in a recess, the recess receiving the thermal exchanger in a disposition wherein air can circulate in the interstitial space between an engine external wall and an inner wall of said thermal exchanger, wherein the interstitial space is defined by an intake opening, adjoining a shallow in-slope portion, adjoining a steep in-slope portion, adjoining an arcuate bottom portion, adjoining a steep out-slope portion, adjoining a portion substantially parallel to the axis of the engine, adjoining a shallow out-slope portion, adjoining an exhaust opening, thereby creating a thermal resistance between the engine external wall and the inner wall of said thermal exchanger.

2. The turbojet according to claim 1, wherein the turbojet includes an attaching strut assembly adapted to attach the thermal exchanger to the engine external wall.

3. The turbojet according to claim 2, wherein the attaching strut assembly include at least one strut.

4. The turbojet according to claim 1, wherein the interstitial space forms an air pocket.

5. The turbojet according to claim 1, wherein the engine external wall includes a recess formed therein for receiving at least a portion of the thermal exchanger in a spaced apart disposition.

6. The turbojet according to claim 1, wherein the thermal exchanger is provided with an air inlet, positioned upstream from the thermal exchanger, and adapted to admit air to the interstitial space.

7. The turbojet according to claim 6, wherein the air inlet receives air from a secondary air flow, the secondary air flow passing through the nacelle.

8. The turbojet according to claim 1, wherein the thermal exchanger includes an air outlet positioned downstream from a thermal exchanger body, and adapted to exhaust the air circulating in the interstitial space out of aforesaid interstitial space.

9. The turbojet according to claim 1, wherein the thermal exchanger is positioned circumferentially around the engine.

10. An aircraft including at least one turbojet for the aircraft, the at least one turbojet including an engine located in a nacelle, the aircraft comprising:
a thermal exchanger adapted to cool a liquid participating in the engine propulsive system, wherein said thermal exchanger is located downstream from the nacelle and at a surface level of an external wall of the engine, an interstitial space being defined in a recess, the recess receiving the thermal exchanger in a disposition wherein air can circulate in the interstitial space between an engine external wall and an inner wall of said thermal exchanger, wherein the interstitial space is defined by an intake opening, adjoining a shallow in-slope portion, adjoining a steep in-slope portion, adjoining an arcuate bottom portion, adjoining a steep out-slope portion, adjoining a portion substantially parallel to the axis of the engine, adjoining a shallow out-slope portion, adjoining an exhaust opening, thereby creating a thermal resistance between the engine external wall and the inner wall of said thermal exchanger.

11. The turbojet according to claim 1, wherein the openings are at a surface level of the external wall of the engine to reduce aerodynamic drag.

12. The turbojet according to claim 1, wherein the openings are formed as slots extending the whole width of thermal exchanger.

13. The turbojet according to claim 1, wherein the interstitial space is in fluid communication with two or more openings upstream and two or more openings downstream of the interstitial space, the upstream and downstream openings symmetrical to one another.

14. The turbojet according to claim 1, wherein the at least one opening upstream is a punctual air inlet.

15. The turbojet according to claim 1, wherein a bottle neck is formed within the interstitial space.

16. The turbojet according to claim 1, wherein air circulation between the engine external wall and the inner wall of said thermal exchanger is regulated by one or more valves.

17. A turbojet engine for an aircraft comprising:
a motor housed in a nacelle, wherein an internal wall of the nacelle and an external wall of the motor is at least partially covered with an acoustic coating; and
a thermal exchanger adapted to cool a fluid participating in the propulsion system of the motor, wherein said thermal exchanger is located downstream from the acoustic coating and at a surface level of the external wall of the motor, an interstitial space being defined in a recess, the recess receiving the thermal exchanger in a disposition wherein air can circulate in the interstitial space between an motor external wall and an inner wall of said thermal exchanger, wherein the interstitial space is defined by an intake opening, adjoining a shallow in-slope portion, adjoining a steep in-slope portion, adjoining an arcuate bottom portion, adjoining a steep out-slope portion, adjoining a portion substantially parallel to the axis of the engine, adjoining a shallow out-slope portion, adjoining an exhaust opening, thereby creating a thermal resistance between the motor external wall and the inner wall of said thermal exchanger.

\* \* \* \* \*